United States Patent
Steele et al.

(10) Patent No.: US 9,988,723 B2
(45) Date of Patent: Jun. 5, 2018

(54) SURFACE TREATMENT TO PASSIVATE SUBLIMATION SURFACES TO HYDROPHOBIC CONTAMINANTS

(71) Applicant: Hamilton Sundstrand Space Systems International, Inc., Windsor Locks, CT (US)

(72) Inventors: John W. Steele, New Hartford, CT (US); William F. Oehler, Coventry, CT (US); Tony Rector, East Granby, CT (US)

(73) Assignee: Hamilton Sundstrand Space Systems International, Inc., Windsor Locks, CT (US)

( * ) Notice: Subject to any disclaimer, the term of this patent is extended or adjusted under 35 U.S.C. 154(b) by 421 days.

(21) Appl. No.: 14/957,413

(22) Filed: Dec. 2, 2015

(65) Prior Publication Data

US 2016/0083851 A1 Mar. 24, 2016

Related U.S. Application Data

(62) Division of application No. 13/473,870, filed on May 17, 2012, now Pat. No. 9,227,379.

(51) Int. Cl.
  *C23C 8/10* (2006.01)
  *C23C 28/04* (2006.01)
  *B32B 15/04* (2006.01)
  *C23C 28/00* (2006.01)
  *C23C 8/12* (2006.01)
  *C23C 8/14* (2006.01)
  *C23C 8/80* (2006.01)

(52) U.S. Cl.
  CPC .............. *C23C 28/04* (2013.01); *B32B 15/04* (2013.01); *C23C 8/12* (2013.01); *C23C 8/14* (2013.01); *C23C 8/80* (2013.01); *C23C 28/00* (2013.01)

(58) Field of Classification Search
  CPC .............................................. C23C 8/10–8/18
  See application file for complete search history.

(56) References Cited

U.S. PATENT DOCUMENTS 5,741,372 A 4/1998 Gugel

*Primary Examiner* — Lois Zheng
(74) *Attorney, Agent, or Firm* — Kinney & Lange, P.A.

(57) ABSTRACT

The sublimation capability of a porous metal plate used in a sublimator is maintained by heating the porous metal plate at an elevated temperature in a flowing stream of oxygen for an extended period of time to form an oxidized surface. A short chain molecule, such as citric acid, is attached to the oxidized surface having multiple functional carboxylate groups and no hydrophobic tail.

10 Claims, 3 Drawing Sheets

SURFACE TREATMENT TO PASSIVATE SUBLIMATION SURFACES TO HYDROPHOBIC CONTAMINANTS

CROSS-REFERENCE TO RELATED APPLICATION(S)

This application is a divisional of U.S. application Ser. No. 13/473,870 filed May 17, 2012 for "SURFACE TREATMENT TO PASSIVATE SUBLIMATION SURFACES TO HYDROPHOBIC CONTAMINANTS" by John W. Steele, William F. Oehler, and Tony Rector.

BACKGROUND

A sublimator is a primary cooling device for the Extra-vehicular Mobility Unit (EMU) Space Suit and for the Orion Spacecraft. Its functional heart is a metallic porous plate that is exposed to space vacuum on one side. It is supplied with expendable feed-water on the other side. In operation, the feed-water freezes on the porous plate surface, and the vacuum side progressively sublimes water from this ice to the vacuum of space as waste heat is introduced into the plate.

A sublimator has two fluid loops inside. Both loops are closed. One loop takes fluid from a heat source and the other takes fluid to the porous plate surface. There is no mixing of fluids and the sublimation loop takes heat by metal to metal contact.

Experience has shown that trace contaminants in feed-water (primarily amphipathic long-chain organic acids, fatty acids and surfactants with carboxylate functional groups form a sublimation impeding molecular monolayer that can drastically impact the sublimation process and therefore sublimator performance. Trace processing aids, as exemplified by abietic acid from the early EMU Neoprene Latex feed-water bladders, sodium dodecyl benzene sulfonate (a candidate soap for International Space Station-ISS processed water), and acrylic acid oligomers from one of the current operational ISS Water Processor multi-filtration bed sorbents have exhibited this phenomena.

It is believed that the hydrophilic "heads" of the amphipathic molecules anchor to available cationic charge on the metallic surface of the porous plate, and that the hydrophobic "tails" of the amphipathic molecules form an intertwined monolayer much the same as a lipid bilayer in a cell. This phenomenon does not occur with non-volatile contaminants that do not have the structural features of an amphipathic molecule such as corrosion products, iodine and biofilm. These contaminants merely dislodge from the effluent side of the porous plate during the sublimation process and have minimal effect on performance.

The sensitivity of a sublimator to trace amphipathic molecules that form monolayers (very common processing aids for non-metallic materials) severely restricts the types of materials that can be used to contain and/or transfer feed-water, and it restricts the sources of the feed-water. This has becomes a serious logistics challenge on long-term missions such as on the International Space Station where recycled water that contains trace amounts of acrylic acid oligomer from one of the Water Processor Assembly sorbents is the preferred source of EMU feedwater. What is needed in the art is a means to passivate a sublimator surface to the anchoring of amphipathic contaminants.

SUMMARY

This invention involves a two-step process to passivate a porous plate metallic surface and prevent metal cation charges from forming, so as to prevent anionic carboxylate "heads" of amphipathic contaminates from anchoring on the plate. Since the hydrophobic tails are not fixed in place, they do not intertwine to form a structured sublimation impeding monolayer.

The first step comprises a high temperature oxidation of the metallic plate surface in a flowing stream of oxygen for a minimum of four hours. This step converts most of the positively charged cations of the metal cationic surface to an uncharged oxide.

The second step comprises adding a short-chain molecule with multiple functional carboxylate groups and no hydrophobic tail to render the balance of the metal cation groups passive, or unavailable for carboxylate anchoring by trace amphipathic contaminants.

DETAILED DESCRIPTION

Figure 1:
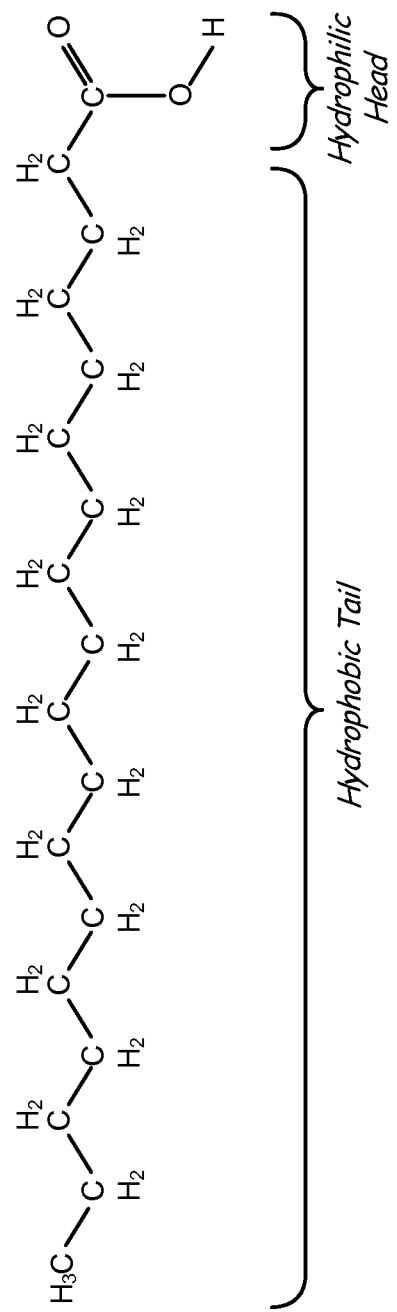
FIG. 1 is a diagram of a long chain organic acid with a hydrophilic head and a hydrophobic tail.
Figure 2:
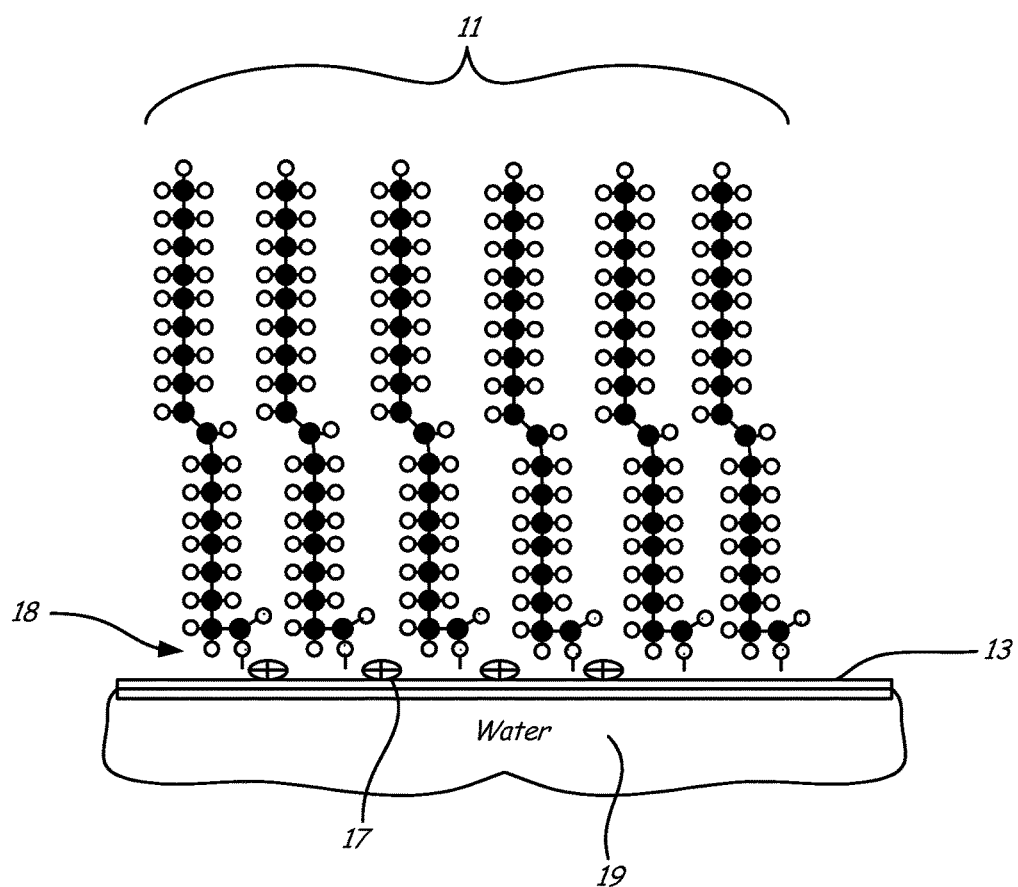
FIG. 2 is a diagram showing long chain organic acid forming a sublimation impending monolayer.

FIG. 1 is a diagram of a long chain organic acid with a hydrophilic head and long hydrophobic tail. FIG. 2 illustrates a plurality of attached long chain organic acid tails that become entangled or intertwined to form a sublimation impeding monolayer 11. The sublimator porous surface plate 13 has the hydrophilic heads 18 attached due to the porous plate cationic charge 17, thus preventing water 19 from sublimating though plate 13. In an example, the hydrophilic heads 18 are anionic carboxylate "heads" of amphipathic contaminants.

In an embodiment, a two-step process to passivate a porous metal plate in order to maintain a sublimation capability of the plate is illustrated. Step one of this invention involves a high temperature oxidation of the metallic plate of the sublimator in a flowing stream of oxygen for a minimum of four hours. The temperature ranges from about 900° F. (482° C.) to about 1200° F. (649° C.). Longer times are also contemplated. The sublimator plate is typically made from stainless steel and is porous as is standard in the industry. The present invention is also useful for nickel based alloy porous plates. This step converts positively charged cations of the metal cationic surface to an uncharged oxide, exemplified by the reaction series below.

Charged nickel cation on the surface of a stainless steel porous plate reacts:

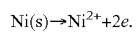

$$Ni(s) \rightarrow Ni^{2+} + 2e.$$

Oxygen in the presence of heat reacts:

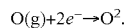

$$O(g) + 2e^- \rightarrow O^{2-}.$$

Nickel passivated as nickel oxide

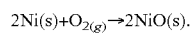

$$2Ni(s) + O_{2(g)} \rightarrow 2NiO(s).$$

The high temperature oxidation (step one) is then followed with a step two, where a short-chain molecule with multiple functional carboxylate groups and no hydrophobic tail is used to render the balance of metal cation groups passive. The short chain molecule may be any four carbon or less organic acids with one or more carboxylate groups.

Citric acid has been found to be effective as the short chain molecule in step two. A citric acid pickling is accomplished by submerging the porous plate in a low concentration of citric acid for a minimum of two hours or flowing through the porous plate. A typical concentration of citric acid in water would be 0.1 molar or less. Citric acid is environmentally relatively benign and remains present and bound under operating conditions of about less than 120° F. (48.9° C.) due to its low vapor pressure. Citric acid decomposes at 307° F. (152.8° C.).

Figure 3:
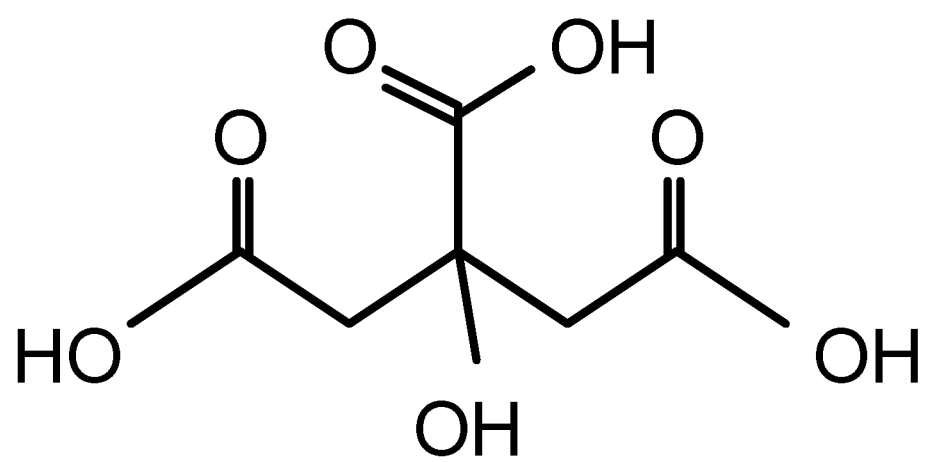
FIG. 3 is a diagram of a citric acid molecule with multiple carboxylate heads and no hydrophobic tails.

With the present invention high temperature oxidation (step one) and short chain molecule addition such as citric acid (step two), multiple functional carboxylate groups attach without becoming intertwined, as seen in FIG. 3. The sublimation impeding hydrophobic monolayer permits the use of other water sources for the space suit or space station.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of maintaining sublimation capability of a porous metal plate having a porous passivated surface for use in a sublimator, the method comprising:
   heating the porous metal plate at an elevated temperature in a flowing stream of oxygen for an extended period of time to form a first portion of the passivated surface with an uncharged oxide; and
   after the heating step, attaching a plurality of short chain molecules to form a second portion of the passivated surface, each short chain molecule having multiple functional carboxylate groups and no hydrophobic tail;
   wherein the plurality of short chain molecules include a four carbon or less organic acid having at least one carboxylate group.

2. The method of claim 1, wherein the elevated temperature ranges from about 900° F. (482° C.) to about 1200° F. (649° C.).

3. The method of claim 1, wherein the porous plate is heated at the elevated temperature for at least four hours.

4. The method of claim 1, wherein the porous plate is made from a metal selected from the group consisting of stainless steel and nickel based alloys.

5. The method of claim 4, wherein the porous plate is made from stainless steel.

6. The method of claim 1, wherein the plurality of short chain molecules comprise citric acid.

7. The method of claim 6, wherein the attaching step comprises:
   submerging the porous plate in a dilute solution of citric acid for at least two hours.

8. The method of claim 7, wherein the dilute solution is less than 0.1 molar citric acid in water.

9. A method of maintaining sublimation capability of a porous stainless steel plate having a porous passivated surface for use in a sublimator, the method comprising:
   heating the porous stainless steel plate at an elevated temperature from about 900° F. (482° C.) to about 1200° F. (649° C.) in a flowing stream of oxygen for at least four hours to form a first portion of the passivated surface with an uncharged oxide; and
   after the heating step, submerging the plate in a dilute solution of citric acid for at least two hours to attach citric acid to form a second portion of the passivated surface.

10. The method of claim 9, wherein the dilute solution is less than 0.1 molar citric acid in water.

\* \* \* \* \*